(12) United States Patent
Spencer et al.

(10) Patent No.: US 7,078,235 B2
(45) Date of Patent: Jul. 18, 2006

(54) SULFUR TRIOXIDE CONDITIONING SYSTEM CONTROL ALGORITHM

(75) Inventors: Herbert W. Spencer, Valencia, CA (US); Ralph F. Altman, Chattanooga, TN (US)

(73) Assignee: Electric Power Research Institute, Palo Alto, CA (US)

( * ) Notice: Subject to any disclaimer, the term of this patent is extended or adjusted under 35 U.S.C. 154(b) by 537 days.

(21) Appl. No.: 10/309,702

(22) Filed: Dec. 4, 2002

(65) Prior Publication Data

US 2003/0182020 A1 Sep. 25, 2003

Related U.S. Application Data

(60) Provisional application No. 60/338,152, filed on Dec. 6, 2001.

(51) Int. Cl.
*G01N 33/24* (2006.01)
(52) U.S. Cl. .................. 436/32; 326/119; 326/120
(58) Field of Classification Search ............... None
See application file for complete search history.

(56) References Cited

U.S. PATENT DOCUMENTS

| 3,704,569 A | 12/1972 | Hardison et al. ............. 55/4 |
| 4,333,746 A | 6/1982 | Southam ................. 55/106 |
| 4,844,723 A | 7/1989 | Tellini et al. .............. 55/106 |
| 5,011,516 A | 4/1991 | Altman et al. ............... 55/5 |
| 5,229,077 A * | 7/1993 | Bell et al. ................ 422/168 |
| 5,665,142 A | 9/1997 | Wright ..................... 95/58 |

OTHER PUBLICATIONS

Douglas "Real time measurement of fly ash resistivity and automatic adjustment of rapper controls and gas conditioning for electrostatic precipitators . . . ", Proceedings of the American Power Conference (1994), 56(1), 879-81.*

Harrison et al. "Medium-sulfur coal and fly ash resistivity", J. Air Pollut. Control Assoc., 1988, v. 38, No. 2, pp. 209-216.*

Spokoyny et al. "Environmentally efficient flue gas conditioning", Proceedings of the International Technical Conference on Coal Utilization & Fuel Systems (1996), 21st, 111-122.*

Srinivas "Status of electrostatic precipitator technology usage in India", TERI Information Monitor on Environmental Science, Jun. 1996, v. 1, No. 1, pp. 1-12.*

Hankins "Recent Dual Flue Gas Conditioning Experience", American Poewer Conferemnce, Apr. 1996, pp. 1-10.*

Durham et al. "Enhancing the performance of older ESPs to provide fuel dflexibility", ADA-ES Publication No. 00001, presented at ENERGEX 2000.*

* cited by examiner

*Primary Examiner*—Yelena G. Gakh
(74) *Attorney, Agent, or Firm*—Armstrong, Kratz, Quintos, Hanson & Brooks, LLP

(57) ABSTRACT

Optimizing fly ash resistivity by controlling concentration of sulfur trioxide ($SO_3$) in flue gas by the use of an algorithm.

2 Claims, No Drawings

SULFUR TRIOXIDE CONDITIONING SYSTEM CONTROL ALGORITHM

RELATED APPLICATION

This application is related to provisional application 60/338,152, filed Dec. 6, 2001, the contents of which are herein incorporated by reference.

FIELD OF THE INVENTION

The herein disclosed invention finds applicability in producing optimum fly ash resistivity in flue gas.

BACKGROUND OF THE INVENTION

Many utilities now burn a variety of coals at their fossil fuel plants. This practice is growing for several reasons, including (1) the need to lower $SO_2$ emissions by burning low-sulfur coals and (2) the need to reduce fuel costs to enhance their competitive position. Frequently, these coal changes have adverse affects on ESPs (ESP=electrostatic precipitator). Low-sulfur coals produce high resistivity ash that is difficult to collect in an electrostatic precipitator (the technology most commonly used to control particulate emissions from coal-fired power plants). Inexpensive coals are frequently variable in their properties and sometimes high in ash or low in sulfur. Conditioning the ash with $SO_3$ before the ash enters a precipitator, can lower ash resistivity and improve ESP performance. In fact, this well established technology is used at several hundred plants both here and abroad to control fly ash resistivity in low-sulfur or variable-sulfur coals. While commercial conditioning systems are relatively reliable, the controls for these are not sophisticated, and this lack of sophistication can result in non-optimum ESP performance, and sometimes excess $SO_3$ addition rates (and emissions).

The inventors have developed a correlation between certain ESP electrical operation parameters and fly ash resistivity. In particular, the inventors have found it to be possible to monitor the current density in an ESP electrical section, and using this number, estimate the resistivity of the fly ash in that electrical section. Using these correlations makes it possible to determine if the resistivity in this section is at an optimum level or not. Further, the inventors have also participated in the development of correlations between fly ash resistivity and the flue gas $SO_3$ concentration needed to produce optimum fly ash resistivity. These correlations can be combined (as described below) to produce a superior $SO_3$ conditioning system control algorithm.

Current $SO_3$ conditioning systems use a preset rate of $SO_3$ addition that is only adjusted for unit load. The invention, described herein, uses a unique combination of calculations to provide a rate of addition that is based on actual ESP operating data. These data, which can easily be obtained from modem ESP controls, are both real time and continuous. Hence, the new control algorithm is capable of producing an optimum rate of $SO_3$ addition when coal and ash properties are changing.

The primary application will be at utility plants that use $SO_3$ conditioning to improve ESP performance. These plants are located both here and abroad. In addition, $SO_3$ is used in some industrial applications, and the new $SO_3$ control algorithm could be used at those plants as well.

SUMMARY OF INVENTION

The herein disclosed invention is directed to a process for treating fly ash found in flue gas to produce effective fly ash electrical resistivity comprising employing an algorithm to determine the optimum amount of sulfur trioxide ($SO_3$) to be added to the flue gas. The sulfur trioxide can result from the burning of coal, or the sulfur trioxide can result from the burning of coal plus the extrinsic addition of sulfur trioxide. The process of this invention involves an algorithm which takes into account 1) flue gas $SO_3$ concentration, 2) initial fly ash resistivity, 3) electrostatic precipitator (ESP) current densities, 4) flue gas temperature and moisture and 5) fly ash composition.

Also, embraced by this invention is a process for treating fly ash found in flue gas to produce effective fly ash resistivity comprising the following steps:

Step 1. Obtain the proximate ultimate analyses of coal being burned in boiler and ash mineral analysis for this coal;

Step 2. Determine the average temperature of flue gas entering the electrostatic precipitator (ESP);

Step 3. Estimate $SO_3$ background level in the flue gas using correlation relating flue gas $SO_3$ to coal type and coal sulfur content.

Step 4. Calculate the base ash resistivity using empirical equations relating ash resistivity to ash composition, flue gas moisture and flue gas temperature.

Step 5. Use a correlation relating the base fly ash resistivity and flue gas $SO_3$ concentration to determine the flue gas $SO_3$ concentration needed to produce the optimum fly ash resistivity.

Step 6. Subtract the background $SO_3$ concentration from the needed $SO_3$ concentration from the needed $SO_3$ that must be added to the flue gas to produce the optimum fly ash resistivity and Step 7. Send rate of addition signal to the controls that operate the $SO_3$ conditioning system.

Another method encompassed by the invention involves determining a most effective injection rate for $SO_3$ into flue gas comprising the following steps:

Step 1. Obtain the proximate and ultimate analysis of the coal being burned in the boiler and the ash mineral analysis for the coal, Step 2. Determine the average temperature of the flue gas entering the ESP from plant instrumentation, Step 3. Estimate $SO_3$ background level in the flue gas using correlation relating flue gas $SO_3$ to coal type and coal sulfur content, Step 4. The secondary current applied to the electrostatic precipitator is obtained from the controls for each transformer-rectifier set that is powering the precipitators, Step 5. Determine effective fly ash resistivity level in the ESP using a correlation that relates fly ash resistivity to ESP current density for each electrical field, average the results to produce an effective resistivity for the ESP.

Step 6. a. If indicated ash resistivity is equal to or less than optimum resistivity, decrease rate of injection by x percent where x is between 5 and 25, or b. if indicated ash resistivity is greater than optimum resistivity, increase rate of injection by x percent where x is between 5 and 25.

Step 7. Repeat Step 6 until indicated fly ash resistivity passes through optimum resistivity point and then set rate of injection at a point in the range bounded by the levels calculated in the last two interactions, and then Step 8. Every y minutes, where y is number between 5 and 30, restart the process beginning at Step 2.

A still further method involves a method for determining a most effective injection rate for $SO_3$ into flue gas comprising the following steps, Step 1. Obtain the proximate and ultimate analysis of the coal being burned in the boiler and the ash mineral analysis for the coal, Step 2. Determine the average temperature of the flue gas entering the ESP from plant instrumentation, Step 3. Estimate $SO_3$ background level in the flue gas using correlation relating flue gas $SO_3$ to coal type and coal sulfur content, Step 4. The secondary current applied to the electrostatic precipitator is obtained from the controls for each transformer-rectifier set that is powering the precipitators, Step 5. Determine effective fly ash resistivity level in the ESP using a correlation that relates fly ash resistivity to ESP current density for each electrical field. Average the results to produce an effective resistivity for the ESP. If this resistivity is not close to, or lower than, the optimum range, proceed with Step 6; otherwise, go to Step 10.

Step 6. Use a correlation relating fly ash composition and flue gas temperature and $SO_3$ concentration to fly ash resistivity to determine the flue gas $SO_3$ concentration to needed to produce the optimum fly ash resistivity, Step 7. Subtract the background $SO_3$ from the needed $SO_3$ concentration from Step 6 to determine the amount of $SO_3$ that must be added to the flue gas to produce the optimum fly ash resistivity.

Step 8. Send rate of additional signal to the controls that operate the $SO_3$ conditioning system.

Step 9. Repeat Steps 4 and 5.

Step 10. a. If indicated ash resistivity is equal to or less than optimum resistivity, decrease rate of injection by x percent where x is between 5 and 25, or b. if indicated ash resistivity is greater than optimum resistivity, increase rate of injection by x percent where x is between 5 and 25.

Step 11. Repeat Step 10 until indicated fly ash resistivity passes through optimum resistivity point and then set rate of injection at a point in the range bounded by the levels calculated in the last two interactions, and then Step 12. Every y minutes, where y is number between 5 and 30, restart the process beginning at Step 2.

DETAILED DESCRIPTION OF THE INVENTION

The herein disclosed invention involves completing a sequence of unique calculations that result in the estimation of the amount of $SO_3$ that must be added to flue gas to produce optimum fly ash electrical resistivity. This sequence of steps is as follows:

"Typical" Starting Conditions:

a. Low flue gas $SO_3$ concentration measured at the ESP inlet—0 to 4 ppm. $SO_3$—example number=3.5.

b. Moderate to high fly ash resistivity—$8\times10^{10}$ ohm-cm to $5\times10^{12}$ ohm-cm.

c. Low ESP power level characterized by low average current densities.

For example, in a three-field electrostatic precipitator the average current densities in the inlet field might be 9.13 na/cm, in the middle field it might be 12.41 na/cm$^2$ and in the outlet field, it might be 15.19 na/cm$^2$. These current densities correspond to a fly ash resistivity of $1.0\times10^{11}$ ohm-cm and this level of resistivity is too high to allow optimum ESP performance (see Table 1).

Desired "End" Conditions:

a. Increased flue gas $SO_3$ measured at ESP inlet—from 2 to 12 ppm, depending on flue gas temperature, flue gas moisture, and fly ash composition.

b. Optimum fly ash resistivity—$8\times10^9$ ohm-cm to $4\times10^{10}$ ohm-cm, depending on ESP collection and reentrainment characteristics—example number $1\times10^{10}$ ohm-cm.

c. High ESP power levels as indicated by current density levels.

For example, when the correct level of $SO_2$ has been added to the flue gas, the average current densities in the ESP would increase to 27.67 na/cm$^2$ in the inlet field, 33.50 na/cm$^2$ in the middle field and 39.50 na/cm$^2$ in the outlet field. The current densities correspond to a fly ash resistivity of $1\times10^{10}$ ohm-cm and this level of resistivity should produce optimum ESP performance (see Table 1).

TABLE 1

Typical Per-Field Current Densities for a Range of Resistivies

|  | FIRST FIELD 1 | SECOND FIELD 2 | THIRD FIELD 3 | FOURTH FIELD 4 | FIFTH FIELD 5 |
|---|---|---|---|---|---|
| PARAMETER 1 | 6.255 | 5.839 | 5.697 | 5.018 | 4.718 |
| PARAMETER 2 | 0.4813 | 0.4314 | 0.4105 | 0.3405 | 0.3036 |
| RESISTIVITY (ohm * cm) | CURRENT na/cm$^2$ | CURRENT na/cm$^2$ | CURRENT na/cm$^2$ | CURRENT na/cm$^2$ | CURRENT na/cm$^2$ |
| 1.00E+10 | 27.67 | 33.50 | 39.08 | 41.02 | 48.08 |
| 2.00E+10 | 19.82 | 24.84 | 29.41 | 32.40 | 38.96 |
| 4.00E+10 | 14.20 | 18.42 | 22.12 | 25.59 | 31.57 |
| 6.00E+10 | 11.68 | 15.46 | 18.73 | 22.29 | 27.91 |
| 8.00E+10 | 10.17 | 13.66 | 16.64 | 20.21 | 25.58 |
| 1.00E+11 | 9.13 | 12.41 | 15.19 | 18.73 | 23.90 |

TABLE 1-continued

Typical Per-Field Current Densities for a Range of Resistivies

|  | FIRST FIELD 1 | SECOND FIELD 2 | THIRD FIELD 3 | FOURTH FIELD 4 | FIFTH FIELD 5 |
|---|---|---|---|---|---|
| PARAMETER 1 | 6.255 | 5.839 | 5.697 | 5.018 | 4.718 |
| PARAMETER 2 | 0.4813 | 0.4314 | 0.4105 | 0.3405 | 0.3036 |
| RESISTIVITY (ohm * cm) | CURRENT na/cm$^2$ | CURRENT na/cm$^2$ | CURRENT na/cm$^2$ | CURRENT na/cm$^2$ | CURRENT na/cm$^2$ |
| 2.00E+11 | 6.54 | 9.20 | 11.43 | 14.79 | 19.36 |
| 4.00E+11 | 4.69 | 6.82 | 8.60 | 11.68 | 15.69 |
| 6.00E+11 | 3.86 | 5.73 | 7.28 | 10.18 | 13.87 |
| 8.00E+11 | 3.36 | 5.06 | 6.47 | 9.23 | 12.71 |
| 1.00E+12 | 3.02 | 4.59 | 5.90 | 8.55 | 11.88 |
| 2.30E+12 | 2.02 | 3.21 | 4.19 | 6.44 | 9.23 |
| 4.00E+12 | 1.55 | 2.53 | 3.34 | 5.33 | 7.80 |
| 6.00E+12 | 1.27 | 2.12 | 2.83 | 4.65 | 6.90 |
| 8.00E+12 | 1.11 | 1.87 | 2.51 | 4.21 | 6.32 |
| 1.00E+13 | 1.00 | 1.70 | 2.29 | 3.90 | 5.90 |

Note:
Resistivities and current densities above the line are in the range that will produce optimum ESP performance. Resistivities and current densities below the line are in the range that will produce suboptimum ESP performance This invention has several methods to determine the rate of $SO_3$ addition that will produce the optimum level of fly ash resistivity and hence optimum ESP performance. The first method does not require data feed back from the ESP, while the second method does.

Method 1 is as follows:

Step 1. Obtain the proximate and ultimate analyses of the coal being burned in the boiler and the ash mineral analysis for this coal. Table 2 contains examples of typical analyses.

TABLE 2

| Example Coal Composition As Received Ultimate Analysis (%) | | Example Fly Ash Composition As Constituents (%) | |
|---|---|---|---|
| Carbon | 68.00 | $LiO_2$ | 0.01 |
| Hydrogen | 3.86 | $Na_2O$ | 0.96 |
| Oxygen | 6.00 | $K_2O$ | 2.43 |
| Nitrogen | 1.00 | $MgO$ | 0.78 |
| Sulfur | 2.20 | $CaO$ | 2.62 |
| Moisture | 3.60 | $Fe_2O_3$ | 7.76 |
| Ash | 16.34 | $Al_2O_3$ | 17.85 |
| SUM | 100.00 | $SiO_2$ | 61.00 |
|  |  | $TiO_2$ | 0.62 |
|  |  | $P_2O_5$ | 0.55 |
|  |  | $SO_3$ | 2.43 |
|  |  | SUM | 97.01 |

Step 2. Determine the average temperature of the flue gas entering the ESP from plant instrumentation. For example, the instrumentation indicates the temperature of the flue gas entering the RSP is 291° F.

Step 3. Estimate $SO_3$ background level in the flue gas using correlation relating flue gas $SO_3$ to coal type and coal sulfur content. The $SO_3$ concentration is calculated as a percentage of $SO_2$ in the flue gas which can be determined from a combustion calculation using the coal analysis and flue gas $O_2$ or $CO_2$ or if the flue gas $SO_2$ is available from plant instruments, this number can be used in the $SO_3$ calculation. Using standard, well known chemical formulas and procedures, that calculation is as follows if the assumption for no excess air is used.

A. Calculation of Combustion Products, Air, and $O_2$ for 100% Combustion.

| Coal Constituent | Ultimate analysis lb/100 lb fuel | | Molecular weight | Moles per 100 lb fuel | | Multipliers[1] | Required for combustion Moles/100 lb fuel at 100% total air | |
|---|---|---|---|---|---|---|---|---|
|  |  |  |  |  |  |  | $O_2$ | Dry Air |
| C | 68.00 | ÷ | 12.01 | = | 5.662 | × 1.0 and 4.76 | 5.662 | 26.951 |
| $H_2$ | 3.86 | ÷ | 2.02 | = | 1.911 | × 0.50 and 2.38 | 0.956 | 4.548 |
| $O_2$ | 6.00 | ÷ | 32.00 | = | 0.188 | × −1.00 and −4.76 | −0.188 | −0.895 |
| $N_2$ | 1.00 | ÷ | 28.01 | = | 0.036 |  |  |  |
| S | 1.20 | ÷ | 32.06 | = | 0.037 | × 1.00 and 4.76 | 0.037 | 0.176 |

| Coal Constiuent | Ultimate analysis lb/100 lb fuel | | Molecular weight | Moles per 100 lb fuel | Multipliers[1] | Required for combustion Moles/100 lb fuel at 100% total air | |
|---|---|---|---|---|---|---|---|
| | | | | | | $O_2$ | Dry Air |
| $H_2O$ | 3.60 | ÷ | 18.02 | = 0.200 | | | |
| Ash | 16.34 | | — | — | | | |
| Sum | 100.00 | | | 8.034 | | 6.467 | 30.780 |

A correction for excess air, which is always added to the furnace to ensure complete combustion is next made as follows.

B. Calculation of Air and $O_2$ for 30% Excess Air (Typical Excess Air Level).

| | Required for Combustion moles/100 lb fuel at 30% excess air | |
|---|---|---|
| | $O_2$ | Dry air |
| $O_2$ and air × 130/100 total | 8.407 | 40.014 |
| Excess air = 40.014 − 30.780 | — | 9.234 |
| Excess $O_2$ = 8.407 − 6.467 | 1.940 | — |

Using the values from these two calculations, the final composition of the flue gas is calculated, again using established and well known formulas and procedures.

C. Calculation of Flue Gas Composition.

| Flue gas Constituent | Combustion/Fuel/Air | | Products of Combustion | | |
|---|---|---|---|---|---|
| | | | Total moles/100 lb fuel | % by volume wet basis | % by volume dry basis |
| $CO_2$ | 5.662 | = | 5.662 | 13.406 | 14.412 |
| $H_2O$ | 1.911 + 0.200 + 0.838[a] | = | 2.949 | 6.983 | — |
| $SO_2$ | 0.037 | = | 0.037 | 0.088 | 0.094 |
| $N_2$ | 0.036 + 31.611[b] | = | 31.647 | 74.931 | 80.555 |
| $O_2$ | 1.940 | = | 1.940 | 4.593 | 4.938 |
| Sum wet | | | 42.235 | | |
| Sum dry = | 42.235 − 2.949 | | 39.286 | | |

[a] Moles $H_2O$ in air = (40.014 × 29 × 0.013) ÷ 18 = 0.838
[b] Moles $N_2$ in air = (40.014 × 0.79) = 31.611

The critical numbers from these calculations are the $SO_2$ concentrations:

0.088%, wet basis, and

094%, dry basis.

The moisture concentration, 6.98% is also critical Once these numbers are known, the native $SO_3$ concentration in the flue gas can be calculated as follows:

The $SO_2$ concentration dry (the resistivity concentration in this example uses the equivalent $SO_3$ concentration of "dry" flue gas) is equal to 0.094%. the appropriate $SO_2$ to $SO_3$ conversion factor for this coal is 0.4% so the approximate $SO_3$ concentration is:

$$0.00094 \times 0.004 = 3.76 \text{ PPM (dry basis)}$$

As an alternative, the flue gas $SO_2$ concentration can be obtained from the plant's Continuous Emissions Monitoring (CEM) system, corrected for flue gas moisture concentration using factors from the combustion calculation and multiplied by the factor 0.004 to estimate to inherent or background $SO_3$ concentration. For other coals, for example, western coals, the appropriate conversion factor is 0.001 and for Powder River Basin Coals, the conversion factor is 0.005 (as opposed to 0.004).

Step 4. Calculate the base ash resistivity using empirical equations relating ash resistivity to ash composition, flue gas moisture and flue gas temperature. The Bickelhaupt equations are an example of relationships that can be used for this calculation. This particular calculation is made using the ash mineral analysis from Table 2 and the moisture and $SO_3$ calculations from step 2 using the following sequence of substeps:

Substep 1: Normalize the weight percentages to sum 100% by dividing each specified percentage by the sum of the specified percentages.

Substep 2: Divide each oxide percentage by the respective molecular weight to obtain the mole fractions.

Substep 3: Divide each mole fraction by the sum of the mole fractions and multiply by 100 to obtain the molecular percentages as oxides.

Substep 4: Multiply each molecular percentage by the decimal fraction of cations in the given oxide to obtain the atomic concentrations.

These substeps are illustrated for the example ash in the following table.

| Oxide | Specified Weight % | Normalized Weight % | Molecular Weight | Mole Fraction | Molecular Percentage | Cationic Fraction | Atomic Concentration Of Cation |
|---|---|---|---|---|---|---|---|
| $Li_2O$ | 0.01 | 0.01 | 29.88 | 0.00034 | 0.024 | 0.67 | 0.016 |
| $Na_2O$ | 0.96 | 0.99 | 61.98 | 0.01600 | 1.116 | 0.67 | 0.744 |
| $K_2O$ | 2.43 | 2.50 | 94.20 | 0.02654 | 1.854 | 0.67 | 1.236 |
| MgO | 0.78 | 0.80 | 40.31 | 0.01985 | 1.387 | 0.50 | 0.694 |
| CaO | 2.62 | 2.70 | 56.08 | 0.04815 | 3.364 | 0.50 | 1.682 |
| $Fe_2O_3$ | 7.76 | 8.00 | 159.70 | 0.05009 | 3.500 | 0.40 | 1.400 |
| $Al_2O_3$ | 17.85 | 18.40 | 101.96 | 0.18046 | 12.608 | 0.40 | 5.043 |
| $SiO_2$ | 61.00 | 62.89 | 60.09 | 1.04660 | 73.123 | 0.33 | 24.368 |
| $TiO_2$ | 0.62 | 0.64 | 79.90 | 0.00801 | 0.560 | 0.33 | 0.186 |
| $P_2O_5$ | 0.55 | 0.57 | 141.94 | 0.00402 | 0.281 | 0.29 | 0.080 |
| $SO_3$ | 2.43 | 2.50 | 80.06 | 0.03123 | 2.183 | 0.25 | 0.546 |
| Sum | 97.01 | 100.00 | | 1.43129 | 100.000 | | |

Now that the atomic concentrations of the critical ash mineral constituents are known, the rest of the calculation proceeds by calculating three separate resistivities, the volume resistivity, $\rho_v$, the surface resistivity, $\rho_s$, and the acid resistivity, $\rho_a$. These three resistivities are then combined to give the net resistivity of the ash using the parallel resistance formula. For the example coal, the calculation proceeds as follows using the following formulas and definitives.

Bickelhaupt Equations $\rho_v = \exp[-1.8916 \ln X - 0.9696 \ln Y + 1.234 \ln Z + 3.62876 - (0.069078)E + 9980.58/T]$ $\rho_s = \exp[27.59774 - 2.233348 \ln X - (0.00176)W - (0.069078)E - (0.00073895)(W)\exp(2303.3/T)]$ $\rho_a = \exp[85.1405 - (0.708046)CSO_3 - 23267.2/T - (0.069078)EJ]$, for $z<3.5\%$ or $K>1.0\%$ $\rho_a = \exp[59.0677 - (0.854721)CSO_3 - 13049.47/T - (0.069078)EJ]$, for $z<3.5\%$ or $K>1.0\%$ $1/\rho_{vs} = 1/\rho_v + 1/\rho_s$ $1/\rho_{vsa} = 1/\rho_{vs} + 1/\rho_a$ $\rho_v$ = volume resistivity (ohm-cm)
$\rho_s$ = surface resistivity (ohm-cm)
$\rho_a$ = adsorbed acid resistivity (ohm-cm)
$\rho_{vs}$ = volume and surface resistivity (ohm-cm)
$\rho_{vsa}$ = total resistivity (ohm-cm)
X = Li+Na percent atomic concentration
Y = Fe percent atomic concentration
Z = Mg+Ca percent atomic concentration
K = K percent atomic concentration
T = absolute temperature (K)
W = moisture in flue gas (volume %)
$CSO_3$ = concentration of $SO_3$ (ppm, dry)
E = applied electric field (kV/cm)

Using the above definitions, equations and calculated values, the calculation proceeds for the example case as follows:

X = 0.016 + 0.744 = 0.76
Y = 1.40
Z = 0.694 + 1.682 = 2.376
K = 1.236
T = 417 (Example gas temperature 291° F.)
W = 6.983
$CSO_3$ = (from Calculation 2) 3.76 ppm, dry
E = 10 (typical electric field value)

$\rho_v = \exp[-1.8916 \ln(0.76) - 0.9696 \ln(1.40) + 1.237 \ln(2.376) + 3.62876 - (0.069078)(10) + 9980.58/417]$ $= 1.636 \times 10^{12}$ ohm-cm $\rho_s = \exp[27.59774 - 2.23348 \ln(0.76) - (0.00176)(6.983) - (0.069078)(10) - (0.00073895)(6.983)\exp(2303.0/417)]$ $= 2.392 \times 10^{11}$ ohm-cm $\rho_a = \exp[85.1405 - (0.708046)(3.76) - 23267.2/417 - (0.069078)(10)]$ $= 1.939 \times 10^{11}$ ohm-cm $1/\rho_{vs} = 1/1.636 \times 10^{12} + 1/2.392 \times 10^{11} = 4.792 \times 10^{-12}$ $\rho_{vs} = 2.1 \times 10^{11}$ ohm-cm $1/\rho_{vsa} = 1/4.792 \times 10^{-12} + 1/1.939 \times 10^{11} = 9.949 \times 10^{-12}$ $\rho_{vsa} = 1.0 \times 10^{11}$ ohm-cm In this example, the calculated resistivity is found to be $1.0 \times 10^{11}$ ohm-cm, which is too high for optimum ESP performance, so additional $SO_3$ must be added to the flue gas.

Step 5. Use a correlation relating the base fly ash resistivity and flue gas $SO_3$ concentration to determine the flue gas $SO_3$ concentration needed to produce the optimum fly ash resistivity.

From the preceding step, the relationships between the acid resistivity, surface resistivity, volume resistivity and net ash resistivity are known. Further, it is known that the desirable level of resistivity is $1.0 \times 10^{10}$ ohm-cm. Hence, the calculation proceeds as follows:

$1/\rho_{vsa} = 1/\rho_{vs} + 1/\rho_a$ where $\rho_{vsa} = 1 \times 10^{10}$ ohm-cm (the desirable $\rho$)

$\rho_{vs} = 2.1 \times 10^{11}$ ohm-cm (from preceding calculation)

$$1/\rho_a = 1/\rho_{vsa} - 1/\rho_{vs}$$

$$= 1.0 \times 10^{10} - 2.761905 \times 10^{12}$$

$$= 9.5238 \times 10^{11}$$

$\rho_{va} = 1.05 \times 10^{10}$ ohm-cm also from the preceding calculation, $\rho_a = \exp[85.1405 - (0.708046)CSO_3 - 23267.2/T - (0.069078)E]$ where T=417 (from preceding calculation)
E=10 (from preceding calculation)

hence $1.05 \times 10^{10} = \exp[85.1405 - (0.708046)CSO_3 - 23267.2/417 - (0.069078)(10)]$ $\ln(1.05 \times 10^{10}) = 85.1405 - (0.708046)CSO_3 - 55.79664 - 0.69078$ $23.07464109 = 28.652 - (0.708046)CSO_3$ $(0.708046)CSO_3 = 5.578$ $CSO_3 = 7.878$ Correcting for wet conditions $SO_3$ needed $= 7.878 \times (39.286/42.235) = 7.33$ ppm Step 6. Subtract the background $SO_3$ concentration from the needed $SO_3$ concentration from the needed $SO_3$ that must be added to the flue gas to produce the optimum fly ash resistivity.

The combustion calculation results and the background $SO_3$ calculation in step 2, the $SO_3$ concentration is estimated to be $0.00088 \times 0.004 = 3.52$ ppm (wet basis). From the desired level calculation above, the desirable $SO_3$ level=7.33 ppm, hence the difference=7.33−3.52=3.81 ppm. Hence, 3.81 ppm, $SO_3$ must be added to the flue gas to produce the desired level of fly ash resistivity.

Step 7. Send rate of addition signal to the controls that operate the $SO_3$ conditioning system. In this case, the signal should be sent that will cause the $SO_3$ conditioning system to add 3.8 ppm $SO_3$ to the flue gas.

Notice that this procedure uses the equations developed by Dr. Bickelhaupt to relate flue gas composition and ash mineral analysis in the calculations, but any set equations relating flue gas $SO_3$ concentrations and ash mineral analysis to fly ash resistivity could be used. For example, the equations developed by Joe McCain and published in EPRI technical report 1004075 can be used.

This concludes Method 1.

Method 2 is as follows:

The example calculation for this method resumes the same starting conditions that were assumed for method 1. They are as follows:

a. Low flue gas $SO_3$ concentration measured at the ESP inlet—0 to 4 ppm: $SO_3$ —example number=3.5.

b. Moderate to high fly ash resistivity—$8 \times 10^{10}$ ohm-cm to $5 \times 10^{12}$ ohm-cm.

c. Low ESP power level characterized by low average current densities.

For example, in a three-field electrostatic precipitator the average current densities in the inlet field might be 9.13 na/cm$^2$, in the middle field it might be 12.41 na/cm$^2$ and the outlet field might be 15.19 na/cm$^2$. These current densities correspond to a fly ash resistivity of $1.0 \times 10^{11}$ ohm-cm and this level of resistivity is too high to allow optimum ESP performance (see Table 1).

Typical Per-Field Current Densities for a Range of Resistivies

| | FIRST FIELD 1 | SECOND FIELD 2 | THIRD FIELD 3 | FOURTH FIELD 4 | FIFTH FIELD 5 |
|---|---|---|---|---|---|
| PARAMETER 1 | 6.255 | 5.839 | 5.697 | 5.018 | 4.718 |
| PARAMETER 2 | 0.4813 | 0.4314 | 0.4105 | 0.3405 | 0.3036 |
| RESISTIVITY (ohm * cm) | CURRENT na/cm$^2$ | CURRENT na/cm$^2$ | CURRENT na/cm$^2$ | CURRENT na/cm$^2$ | CURRENT na/cm$^2$ |
| 1.00E+10 | 27.67 | 33.50 | 39.08 | 41.02 | 48.08 |
| 2.00E+10 | 19.82 | 24.84 | 29.41 | 32.40 | 38.96 |
| 4.00E+10 | 14.20 | 18.42 | 22.12 | 25.59 | 31.57 |
| 6.00E+10 | 11.68 | 15.46 | 18.73 | 22.29 | 27.91 |
| 8.00E+10 | 10.17 | 13.66 | 16.64 | 20.21 | 25.58 |
| 1.00E+11 | 9.13 | 12.41 | 15.19 | 18.73 | 23.90 |
| 2.00E+11 | 6.54 | 9.20 | 11.43 | 14.79 | 19.36 |
| 4.00E+11 | 4.69 | 6.82 | 8.60 | 11.68 | 15.69 |
| 6.00E+11 | 3.86 | 5.73 | 7.28 | 10.18 | 13.87 |
| 8.00E+11 | 3.36 | 5.06 | 6.47 | 9.23 | 12.71 |
| 1.00E+12 | 3.02 | 4.59 | 5.90 | 8.55 | 11.88 |
| 2.30E+12 | 2.02 | 3.21 | 4.19 | 6.44 | 9.23 |
| 4.00E+12 | 1.55 | 2.53 | 3.34 | 5.33 | 7.80 |
| 6.00E+12 | 1.27 | 2.12 | 2.83 | 4.65 | 6.90 |

-continued

Typical Per-Field Current Densities for a Range of Resistivies

|  | FIRST FIELD 1 | SECOND FIELD 2 | THIRD FIELD 3 | FOURTH FIELD 4 | FIFTH FIELD 5 |
|---|---|---|---|---|---|
| PARAMETER 1 | 6.255 | 5.839 | 5.697 | 5.018 | 4.718 |
| PARAMETER 2 | 0.4813 | 0.4314 | 0.4105 | 0.3405 | 0.3036 |
| RESISTIVITY (ohm * cm) | CURRENT na/cm$^2$ | CURRENT na/cm$^2$ | CURRENT na/cm$^2$ | CURRENT na/cm$^2$ | CURRENT na/cm$^2$ |
| 8.00E+12 | 1.11 | 1.87 | 2.51 | 4.21 | 6.32 |
| 1.00E+13 | 1.00 | 1.70 | 2.29 | 3.90 | 5.90 |

Note:
Resistivities and current densities above the line are in the range that will produce optimum ESP performance. Resistivities and current densities below the line are in the range that will produce suboptimum ESP performance As in the Method 1 example calculation, the desired end point is the same. It is described in the following paragraph:

Desired "End" Conditions:

a. Increased flue gas $SO_3$ measured at ESP inlet—from 2 to 12 ppm, depending on flue gas temperature, flue gas moisture, and fly ash composition.

b. Optimum fly ash resistivity—$8\times10^9$ ohm-cm to $4\times10^{10}$ ohm-cm, depending on ESP collection and reentrainment characteristics—example number $1\times10^{10}$ ohm-cm.

c. High ESP power levels as indicated by current density levels.

For example, when the correct level of $SO_3$ has been added to the flue gas, the average current densities in the ESP would increase to 27.67 nA/cm$^2$ in the inlet field, 33.50 na/cm$^2$ in the middle field, and 39.08 na/cm$^2$ in the outlet field. The current densities correspond to a fly ash resistivity of $1\times10^{10}$ ohm-cm and this level of resistivity should produce optimum ESP performance (see Table 1).

Method 2 uses the following alternative sequence of steps to determine the optimum injection rate for $SO_3$:

Step 1. Obtain the proximate and ultimate analysis of the coal being burned in the boiler and the ash mineral analysis for this coal. Table 2 contains examples of typical analysis.

TABLE 2

| Example Coal Composition As Received Ultimate Analysis (%) | | Example Fly Ash Composition As Constituents (%) | |
|---|---|---|---|
| Carbon | 68.00 | LiO2 | 0.01 |
| Hydrogen | 3.86 | Na$_2$O | 0.96 |
| Oxygen | 6.00 | K$_2$O | 2.43 |

TABLE 2-continued

| Example Coal Composition As Received Ultimate Analysis (%) | | Example Fly Ash Composition As Constituents (%) | |
|---|---|---|---|
| Nitrogen | 1.00 | MgO | 0.78 |
| Sulfur | 2.20 | CaO | 2.62 |
| Moisture | 3.60 | Fe$_2$O$_3$ | 7.76 |
| Ash | 16.34 | Al$_2$O$_3$ | 17.85 |
| SUM | 100.00 | SiO$_2$ | 61.00 |
|  |  | TiO$_2$ | 0.62 |
|  |  | P$_2$O$_5$ | 0.55 |
|  |  | SO$_3$ | 2.43 |
|  |  | SUM | 97.01 |

Step 2. Determine the average temperature of the flue gas entering the ESP from plant instrumentation. For example, the instrumentation indicates the temperature of the flue gas entering the ESP is 291° F.

Step 3. Estimate $SO_3$ background level in the flue gas using correlation relating flue gas $SO_3$ to coal type and coal sulfur content. The $SO_3$ concentration is calculated as a percentage of $SO_2$ in flue gas which can be determined from a combustion calculation using the coal analysis and flue gas $O_2$ or $CO_2$ or if the flue gas $SO_2$ is available from plant instruments, this number can be used in the $SO_3$ calculation. Using standard, well known chemical formulas and procedures, that calculation is as follows if the assumption for no excess air is used.

A. Calculation of Combustion Products, Air, and $O_2$ for 100% Combustion.

| Coal Constituent | Ultimate analysis lb/100 lb fuel | | Molecular weight | | Moles per 100 lb fuel | | Multipliers[1] | Required for combustion Moles/100 lb fuel at 100% total air | |
|---|---|---|---|---|---|---|---|---|---|
|  |  |  |  |  |  |  |  | O$_2$ | Dry Air |
| C | 68.00 | ÷ | 12.01 | = | 5.662 | × | 1.0 and 4.76 | 5.662 | 26.951 |
| H$_2$ | 3.86 | ÷ | 2.02 | = | 1.911 | × | 0.50 and 2.38 | 0.956 | 4.548 |
| O$_2$ | 6.00 | ÷ | 32.00 | = | 0.188 | × | −1.00 and −4.76 | −0.188 | −0.895 |
| N$_2$ | 1.00 | ÷ | 28.01 | = | 0.036 |  |  |  |  |
| S | 1.20 | ÷ | 32.06 | = | 0.037 | × | 1.00 and 4.76 | 0.037 | 0.176 |

-continued

| Coal Constituent | Ultimate analysis lb/100 lb fuel | Molecular weight | | Moles per 100 lb fuel | Multipliers[1] | Required for combustion Moles/100 lb fuel at 100% total air | |
|---|---|---|---|---|---|---|---|
| | | | | | | $O_2$ | Dry Air |
| $H_2O$ | 3.60 | ÷ 18.02 | = | 0.200 | | | |
| Ash | 16.34 | — | | — | | | |
| Sum | 100.00 | | | 8.034 | | 6.467 | 30.780 |

A correction for excess air, which is always added to the furnace to ensure complete combustion is next made as follows:

B. Calculation of Air and $O_2$ for 30% Excess Air (Typical Excess Air Level).

| | Required for Combustion moles/100 lb fuel at 30% excess air | |
|---|---|---|
| | $O_2$ | Dry air |
| $O_2$ and air × 130/100 total | 8.407 | 40.014 |
| Excess air = 40.014 − 30.780 | — | 9.234 |
| Excess $O_2$ = 8.407 − 6.467 | 1.940 | — |

Using the values from these two calculations, the final composition of the flue gas is calculated, again using established and well known formulas and procedures.

C. Calculation of Flue Gas Composition.

| | Products of Combustion | | | | |
|---|---|---|---|---|---|
| Flue gas Constituent | Combustion/Fuel/Air | | Total moles/100 lb fuel | % by volume wet basis | % by volume dry basis |
| $CO_2$ | 5.662 | = | 5.662 | 13.406 | 14.412 |
| $H_2O$ | 1.911 + 0.200 + 0.838[a] | = | 2.949 | 6.983 | — |
| $SO_2$ | 0.037 | = | 0.037 | 0.088 | 0.094 |
| $N_2$ | 0.036 + 31.611[b] | = | 31.647 | 74.931 | 80.555 |
| $O_2$ | 1.940 | = | 1.940 | 4.593 | 4.938 |
| Sum wet | | | 42.235 | | |
| Sum dry = | 42.235 − 2.949 | | 39.286 | | |

[a] Moles $H_2O$ in air = (40.014 × 29 × 0.013) ÷ 18 = 0.838
[b] Moles $N_2$ in air = (40.014 × 0.79) = 31.611

The critical numbers from these calculations are the $SO_2$ concentrations:

0.0870, wet basis, and
0.0970 dry basis.

The moisture concentration 6.970 is also critical.

Once these numbers are known, the native $SO_3$ concentration in the flue gas can be calculated as follows:

The $SO_2$ concentration dry (the resistivity concentration in this example uses the equivalent $SO_3$ concentration "dry" flue gas) is equal to 0.094%. The appropriate $SO_2$ to $SO_3$ conversion factor for this coal is 0.4% so the approximate $SO_3$ concentration is:

0.00094×0.004=3.76 PPM (dry basis).

As an alternative, the flue gas $SO_2$ concentration can be obtained from the plant's Continuous Emissions Monitoring (CEM) system, corrected for flue gas moisture concentration using factors from the combustion calculation and multiplied by the factor 0.004 to estimate inherent or background $SO_3$ concentration. For other coals, for example, western coals, the approximate conversion factor is 0.001 and for Powder River Basin Coals, the conversion factor is 0.005 (as apposed to 0.004).

To this point, the calculations for Method 1 and Method 2 are the same, however, they are different from this point on.

Step 4. The secondary current applied to the electrostatic precipitator is obtained from the controls for each transformer-rectifier set that is powering the precipitator. These current numbers are translated into current densities by dividing the plate area powered by the transformer-rectifier set. In this example-case, the precipitator has four electrical fields in the direction of gas flow with four transformer-rectifier sets per field.

Readings from the transformer/rectifier sets are as follows:

|  | TR1 | TR2 | TR3 | TR4 |
|---|---|---|---|---|
| Field 1 | 165 ma | 165 ma | 165 ma | 165 ma |
| Field 2 | 224 ma | 224 ma | 224 ma | 224 ma |
| Field 3 | 274 ma | 274 ma | 274 ma | 274 ma |
| Field 4 | 338 ma | 338 ma | 338 ma | 338 ma |

In this example-case, each transformer/rectifier set energized 19,440 ft$^2$ of plate area.

For a typical field, these currents translate into current densities as follows:

$$165 \text{ ma} \times (1.0 \times 10^{-3} \text{ ma/a})/(19{,}440 \text{ ft}^2) = 8.488 \times 10^{-6} \text{ a/ft}^2 = 8.488 \text{ μa/ft}^2$$

$$8.488 \times 10^{-6} \times 1.076 = 9.133 \text{ na/cm}^2$$

Note: 1.0 μa/ft$^2$=1.076 na/cm$^2$

Similar calculations can be used to produce the following table

|  | TR1 | TR2 | TR3 | TR4 |
|---|---|---|---|---|
| Field 1 | 9.13 | 9.13 | 9.13 | 9.13 |
| Field 2 | 12.41 | 12.41 | 12.41 | 12.41 |
| Field 3 | 15.19 | 15.19 | 15.19 | 15.19 |
| Field 4 | 18.73 | 18.73 | 18.73 | 18.73 |

Where the units are nA/cm$^2$

Notice that in this example, all of the TR sets in the same field have been assumed to have the same operating point, i.e., the same voltage and current levels. If these numbers were different, an averaging process, in Step 5, would be used to deal with this more common situation.

Step 5. Determine effective fly ash resistivity level in the ESP using a correlation that relates fly ash resistivity to ESP current density for each electrical field. Average the results to produce an effective resistivity for the ESP. If this resistivity is close to, or lower than, the optimum range, go to Step 10, otherwise proceed to Step 6.

In this example-case, the correlations published in EPRI report CS-5040, table 3-4 are used.

These correlations, after amplification are as follows:

| | |
|---|---|
| Field 1 | $\log_{10}$ (J, nA/cm$^2$) = (6.455 ± 0.370) − 0.5013 $\log_{10}$ (ρ, ohm-cm) |
| Field 2 | $\log_{10}$ (J, nA/cm$^2$) = (6.839 ± 0.360) − 0.5214 $\log_{10}$ (ρ, ohm-cm) |
| Field 3 | $\log_{10}$ (J, nA/cm$^2$) = (5.497 ± 0.304) − 0.3905 $\log_{10}$ (ρ, ohm-cm) |
| Field 4 | $\log_{10}$ (J, nA/cm$^2$) = (5.718 ± 0.327) − 0.4005 $\log_{10}$ (ρ, ohm-cm) |
| Field 5 | $\log_{10}$ (J, nA/cm$^2$) = (3.328 ± 0.306) − 0.1736 $\log_{10}$ (ρ, ohm-cm) |

Where J is in nA/cm$^2$ and ρ is in ohm-cm.

Since, log(e)=1/ln(10) substitution gives:

$$\log(J) = \log(e)\ln(J) = \ln(J)/\ln(10) = \ln(J)/2.302585 \text{ similarly,}$$

$$\log(\rho) = \ln(\rho)/\ln(10) = \ln(\rho)/2.302585 \text{ and further substitution gives:}$$

| | |
|---|---|
| Field 1 | ln(J)/ln(10) = 6.455 − 0.5013 ln(ρ)/ln(10) |
| or | |
| Field 1 | ln(J) = 2.302585 × 6.455 − 0.5013 ln(ρ) |
| Field 1 similarly | ln(J) = 14.8632 − 0.5013 ln(ρ) |
| Field 2 | ln(J) = 15.74738 − 0.5214 ln(ρ) |
| Field 3 | ln(J) = 12.65731 − 0.3905 ln(ρ) |
| Field 4 | ln(J) = 13.16618 − 0.4005 ln(ρ) |
| Field 5 | ln(J) = 7.66300 − 0.1736 ln(ρ) |

These equations are inverted to give the following:

| | |
|---|---|
| Field 1 | ln(ρ) = 29.64931 − 1.994813 ln(J) |
| Field 2 | ln(ρ) = 30.20211 − 1.917913 ln(J) |
| Field 3 | ln(ρ) = 32.41309 − 2.560819 ln(J) |
| Field 4 | ln(ρ) = 32.87435 − 2.496879 ln(J) |
| Field 5 | ln(ρ) = 44.14171 − 5.76037 ln(J) |

From Calculation 3, we have the following:

| | J |
|---|---|
| Field 1 | 9.13 na/cm$^2$ |
| Field 2 | 12.41 na/cm$^2$ |
| Field 3 | 15.19 na/cm$^2$ |
| Field 4 | 18.73 na/cm$^2$ |

Using the ρ vs. J equation gives:

| | ρ |
|---|---|
| Field 1 | 9.1 × 10$^{10}$ ohm-cm |
| Field 2 | 10.4 × 10$^{10}$ ohm-cm |
| Field 3 | 11.3 × 10$^{10}$ ohm-cm |
| Field 4 | 16.2 × 10$^{10}$ ohm-cm |
| Average | 11.8 × 10$^{10}$ ohm-cm |

Note that the resistivity is much higher than the optimum value of 10$^{10}$ ohm-cm.

Step 6. Use a correlation relating fly ash composition and flue gas temperature and SO$_3$ concentration to fly ash resistivity to determine the flue gas SO$_3$ concentration to needed to produce the optimum fly ash resistivity.

That calculation proceeds in a sequence of substeps as follows using the equations developed by Dr. Bickelhaupt and published in EPRI report C9-4145, Appendix A. Starting with the example ash composition in Table 2, complete substep as follows:

Substep 1: Normalize the weight percentages to sum 100% by dividing each specified percentage by the sum of the specified percentages.

Substep 2: Divide each oxide percentage by the respective molecular weight to obtain the mole fractions.

Substep 3: Divide each mole fraction by the sum of the mole fractions and multiply by 100 to obtain the molecular percentages as oxides.

Substep 4: Multiply each molecular percentage by the decimal fraction of cations in the given oxide to obtain the atomic concentrations.

All of these sub-steps are illustrated in the following table for the data in Table 2.

| Oxide | Specified Weight % | Normalized Weight % | Molecular Weight | Mole Fraction | Molecular Percentage | Cationic Fraction | Atomic Concentration Of Cation |
|---|---|---|---|---|---|---|---|
| $Li_2O$ | 0.01 | 0.01 | 29.88 | 0.00034 | 0.024 | 0.67 | 0.016 |
| $Na_2O$ | 0.96 | 0.99 | 61.98 | 0.01600 | 1.116 | 0.67 | 0.744 |
| $K_2O$ | 2.43 | 2.50 | 94.20 | 0.02654 | 1.854 | 0.67 | 1.236 |
| $MgO$ | 0.78 | 0.80 | 40.31 | 0.01985 | 1.387 | 0.50 | 0.694 |
| $CaO$ | 2.62 | 2.70 | 56.08 | 0.04815 | 3.364 | 0.50 | 1.682 |
| $Fe_2O_3$ | 7.76 | 8.00 | 159.70 | 0.05009 | 3.500 | 0.40 | 1.400 |
| $Al_2O_3$ | 17.85 | 18.40 | 101.96 | 0.18046 | 12.608 | 0.40 | 5.043 |
| $SiO_2$ | 61.00 | 62.89 | 60.09 | 1.04660 | 73.123 | 0.33 | 24.368 |
| $TiO_2$ | 0.62 | 0.64 | 79.90 | 0.00801 | 0.560 | 0.33 | 0.186 |
| $P_2O_5$ | 0.55 | 0.57 | 141.94 | 0.00402 | 0.281 | 0.29 | 0.080 |
| $SO_3$ | 2.43 | 2.50 | 80.06 | 0.03123 | 2.183 | 0.25 | 0.546 |
| Sum | 97.01 | 100.00 | | 1.43129 | 100.000 | | |

Using the % atomic concentrations from the above calculations, use the following equations for calculation of fly ash resistivity (Bickelhaupt equations).

$$\rho_v = \exp[-1.8916 \ln X - 0.9696 \ln Y + 1.234 \ln Z + 3.62876 - (0.069078)E + 9980.58/T]$$

$$\rho_s \exp[27.59774 - 2.233348 \ln X - (0.00176)W - (0.069078)E - (0.00073895)(W)\exp(2303.3/T)]$$

$$\rho_a \exp[85.1405 - (0.708046)CSO_3 - 23267.2/T - (0.069078)E], \text{ for } z<3.5\% \text{ or } K>1.0\%$$

$$\rho_a = \exp[59.0677 - (0.854721)CSO_3 - 13049.47/T - (0.069078)E], \text{ for } z>3.5\% \text{ and } K<1.0\%$$

$$1/\rho_{vs} = 1/\rho_v + 1/\rho_s$$

$$1/\rho_{vsa} = 1/\rho_{vs} + 1/\rho_a$$

$\rho_v$ = volume resistivity (ohm-cm)
$\rho_s$ = surface resistivity (ohm-cm)
$\rho_a$ = adsorbed acid resistivity (ohm-cm)
$\rho_{vs}$ = volume and surface resistivity (ohm-cm)
$\rho_{vsa}$ = total resistivity (ohm-cm)
X = Li+Na percent atomic concentration
Y = Fe percent atomic concentration
Z = Mg+Ca percent atomic concentration
K = K percent atomic concentration
T = absolute temperature (K)
W = moisture in flue gas (volume %)
$CSO_3$ = concentration of $SO_3$ (ppm, dry)
E = applied electric field (kV/cm)

For the example case,
X = 0.016 + 0.744 = 0.76
Y = 1.40
Z = 0.694 + 1.682 = 2.376
K = 1.236
T = 417 (Example gas temperature 291° F.)
W = 6.983
$CSO_3$ = (from Calculation 2) 3.76 ppm, dry
E = 10 (typical electric field value)

$$\rho_v = \exp[-1.8916 \ln(0.76) - 0.9696 \ln(1.40) + 1.237 \ln(2.376) + 3.62876 - (0.069078)(10) + 9980.58/417]$$

$= 1.636 \times 10^{12}$ ohm-cm $$\rho_s = \exp[27.59774 - 2.23348 \ln(0.76) - (0.00176)(6.983) - (0.069078)(10) - (0.00073895)(6.983)\exp(2303.0/417)]$$

$= 2.392 \times 10^{11}$ ohm-cm $$\rho_a = \exp[85.1405 - (0.708046)(3.76) - 23267.2/417 - (0.069078)(10)]$$

$= 1.939 \times 10^{11}$ ohm-cm $1/\rho_{vs} = 1/1.636 \times 10^{12} + 1/2.392 \times 10^{11} = 4.792 \times 10^{-12}$ $\rho_{vs} = 2.1 \times 10^{11}$ ohm-cm $1/\rho_{vsa} = 1/4.792 \times 10^{-12} + 1/1.939 \times 10^{11} = 9.949 \times 10^{-12}$ $\rho_{vsa} = 1.0 \times 10^{11}$ ohm-cm This resistivity is consistent with the resistivity calculated from the precipitator current densities, but this consistency is not required for Method 2 since this calculation is being used to obtain an approximate $SO_3$ injection rate which will be refined in the following steps. The approximate level of $SO_3$ injection is calculated as follows:

From the preceding calculation, $$1/\rho_{vsa} = 1/\rho_{vs} + 1/\rho_a$$

where $\rho_{vsa} = 1 \times 10^{10}$ ohm-cm (the desirable $\rho$)

$\rho_{vs} = 2.1 \times 10^{11}$ ohm-cm (from preceding calculation)

$$1/\rho_a = 1/\rho_{vsa} - 1/\rho_{vs}$$
$$= 1.0 \times 10^{10} - 2.761905 \times 10^{12}$$
$$= 9.5238 \times 10^{11}$$

$\rho_{va} = 1.05 \times 10^{10}$ ohm-cm also from Calculation 6, $$\rho_a = \exp[85.1405 - (0.708046)CSO_3 - 23267.2/T - (0.069078)E]$$

where T=417 (from preceding calculation)
E=10 (from preceding calculation)

hence $$1.06 \times 10^{10} = \exp[85.1405 - (0.708046)CSO_3 - 23267.2/417 - (0.069078)(10)]$$

$$\ln(1.05 \times 10^{10}) = 85.1405 - (0.708046)CSO_3 - 55.79664 - 0.69078$$

$$23.07464109 = 28.652 - (0.708046)CSO_3$$

$$(0.708046)CSO_3 = 5.578$$

$$CSO_3 = 7.878$$

Correcting for wet conditions

Hence, the approximate total $$SO_3 \text{ needed} = 7.878 \times (39.286/42.235)$$

$$= 7.33 \text{ ppm}$$

Step 7. Subtract the background $SO_3$ from the needed $SO_3$ concentration from Step 6 to determine the amount of $SO_3$ that must be added to the flue gas to produce the optimum fly ash resistivity. That calculation, for the example-case, proceeds as follows:

The $SO_3$ from combustion calculation and background calculation, $$= 0.00088 \times 0.004 = 3.52 \text{ ppm (wet basis)}$$

From the calculation above, the approximate desirable $SO_3$ level=7.33 ppm.

$$\text{Difference} = 7.33 - 3.52 = 3.81 \text{ ppm.}$$

This calculation shows that approximately 3.8 ppm of $SO_3$ should be added to the flue gas to produce an optimum level of fly ash resistivity.

Consequently, output to $SO_3$ control system a signal that will raise the $SO_3$ level in the flue gas by 3.8 ppm.

Step 8. Send rate of additional signal to the controls that operate the $SO_3$ conditioning system.

Step 9. Repeat Steps 4 and 5.

Step 10.

a. If indicated ash resistivity is equal to or less than optimum resistivity, decrease rate of injection by x percent where x is between 5 and 25.

Or b. If indicated ash resistivity is greater than optimum resistivity, increase rate of injection by x percent where x is between 5 and 25.

Step 11. Repeat Step 10 until indicated fly ash resistivity passes through optimum resistivity point and then set rate of injection at a point in the range bounded by the levels calculated in the last two interactions; for example, at a point that is halfway between the two levels.

Step 12. Every y minutes, where y is number between 5 and 30, restart the process beginning at Step 2.

Obviously, many modifications may be made without departing from the basic spirit of the present invention.

What is claimed is:

1. A method for determining a most effective injection rate for $SO_3$ into a flue gas resulting from a coal burned in a boiler, the method comprising:

1, obtaining proximate and ultimate analyses of the coal being burned in the boiler and ash mineral analysis for the coal, 2, determining an average temperature of the flue gas entering an electrostatic precipitator (ESP) from plant instrumentation, wherein the ESP is powered with multiple electrical fields, 3, estimating $SO_3$ background level in the flue gas using correlation relating flue gas $SO_3$ to coal type and coal sulfur content, 4, obtaining a value of a current applied to the ESP from controls for each transformer-rectifier set that is powering the precipitator, 5, determining an effective fly ash resistivity level in the ESP using a correlation that relates fly ash resistivity to ESP current density for each electrical field, and averaging the results to produce the effective resistivity of the fly ash collected in the ESP, 6, a, if the indicated ash resistivity is equal to or less than an optimum resistivity, decreasing the rate of injection by x percent where x is between 5 and 25, or b, if the indicated ash resistivity is greater than the optimum resistivity, increasing the rate of injection by x percent where x is between 5 and 25, 7, repeating step 6 until the indicated fly ash resistivity passes through an optimum resistivity point, setting the rate of injection at a point in the range bounded by the levels calculated in the last two interactions, and then 8, every y minutes, where y is number between 5 and 30, restarting the process beginning at step 2.

2. A method for determining a most effective injection rate for $SO_3$ into a flue gas resulting from a coal burned in a boiler, the method comprising:

1, obtaining proximate and ultimate analyses of the coal being burned in the boiler and ash mineral analysis for the coal, 2, determining an average temperature of the flue gas entering an electrostatic precipitator (ESP) from plant instrumentation, wherein the ESP is powered with multiple electrical fields, 3, estimating $SO_3$ background level in the flue gas using correlation relating flue gas $SO_3$ to coal type and coal sulfur content, 4, obtaining a value of a current applied to the ESP from controls for each transformer-rectifier set that is powering the precipitator, 5, determining an effective fly ash resistivity level in the ESP using a correlation that relates fly ash resistivity to ESP current density for each electrical field, averaging the results to produce the effective resistivity of the fly ash collected in the ESP, and if this resistivity is not close to, or lower than, the optimum range, proceeding with step 6; otherwise, going to step 10, 6, using a correlation relating fly ash composition and flue gas temperature and $SO_3$ concentration to the fly ash resistivity to determine a flue gas $SO_3$ concentration needed to produce the optimum fly ash resistivity, 7, subtracting the background $SO_3$ from the needed $SO_3$ concentration from step 6 to determine the amount of $SO_3$ that must be added to the flue gas to produce the optimum fly ash resistivity, 8, sending a signal to the controls that operate an $SO_3$ conditioning system to increase the amount of $SO_3$ injected into the flue gas by the additional amount determined in step 7, 9, repeating steps 4 and 5, 10, a, if the indicated ash resistivity is equal to or less than the optimum resistivity, decreasing the rate of injection by x percent where x is between 5 and 25, or b, if the indicated ash resistivity is greater than the optimum resistivity, increasing the rate of injection by x percent where x is between 5 and 25, 11, repeating step 10 until the indicated fly ash resistivity passes through the optimum resistivity point, setting the rate of injection at a point in the range bounded by the levels calculated in the last two interactions, and then 12, every y minutes, where y is number between 5 and 30, restarting the process beginning at step 2.

* * * * *